Oct. 3, 1933. R. H. ROARK Re. 18,964

MEANS AND METHOD FOR SCORING ICE BLOCKS

Original Filed Nov. 25, 1927 3 Sheets-Sheet 1

Inventor

ROBERT H. ROARK

By Emery, Booth, Varney & Holcombe

Attorneys.

Oct. 3, 1933. R. H. ROARK Re. 18,964

MEANS AND METHOD FOR SCORING ICE BLOCKS

Original Filed Nov. 25, 1927 3 Sheets-Sheet 2

Inventor

ROBERT H. ROARK

By Emery, Booth, Varney & Holcombe

Attorneys.

Oct. 3, 1933. R. H. ROARK Re. 18,964

MEANS AND METHOD FOR SCORING ICE BLOCKS

Original Filed Nov. 25, 1927 3 Sheets-Sheet 3

Inventor

ROBERT H. ROARK

By Emery, Booth, Varney & Holcombe

Attorneys.

Reissued Oct. 3, 1933

Re. 18,964

UNITED STATES PATENT OFFICE 18,964

MEANS AND METHOD FOR SCORING ICE BLOCKS

Robert H. Roark, Waco, Tex., assignor, by mesne assignments, to General Ice Scoring Machine Company, Dallas, Tex., a corporation of Delaware Original No. 1,729,186, dated September 24, 1929, Serial No. 235,513, November 25, 1927. Application for reissue September 23, 1931. Serial No. 564,701

19 Claims. (Cl. 125—13)

This invention relates to improvements in ice cutting machines, more particularly to that class of machines whereby a block of ice, and particularly a standard block of ice, for example, artificial ice commercially known as "can-ice", is cut or scored to a certain depth so that the block may be divided into smaller pieces to obviate weighing of the ice and to facilitate the handling thereof and aims to provide an improved method of scoring such ice and an improved machine by which the method may be performed.

The primary object of the present invention is to provide such a machine as indicated above, whereby fluid pressure is utilized together with an embodiment of parts to effect vertical movement of revoluble saws in scoring the ice in a vertical plane, and secondly by an arrangement of similar means to move the ice by fluid pressure between saws to score the ice on a horizontal plane. Other objects and advantages of my invention are apparent from the following detailed description of an illustrative embodiment of the same.

In the drawings herein is illustrated one form of construction whereby the above objects are attained. The invention is not to be understood, however, as being limited to any particular or specific arrangement of parts or to the embodiment herein shown, as fluid pressure may be applied in varied ways.

In Figure 1 is shown a side elevational view of the machine.

Figure 1:
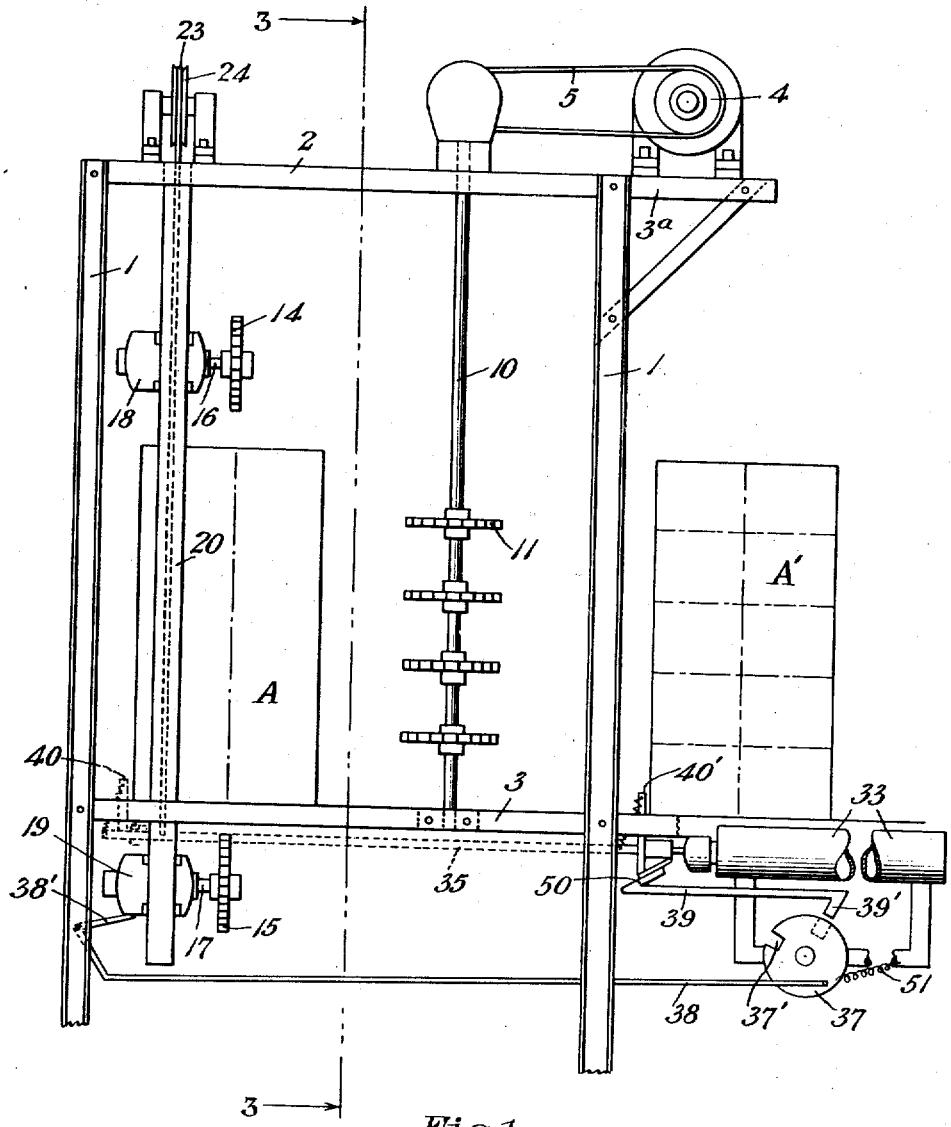

The machine comprises a framework consisting of upright channel irons 1 and cross members 2 connected together to provide a rigid support for the mechanism. The frame includes a base 3 and the cross members 2 are extended at 3*a* beyond the frame to provide a support for a motor 4. The motor is connected by belt 5 to a pulley 6 located on a shaft 7 and by means of gears 8 and 9 drives the spaced vertically positioned shafts 10 carrying a plurality of saws 11. The shafts are seated in bearings 12 and 13 in the cross-member 2 and base 3. These saws 11 are for the purpose of scoring a block of ice on a horizontal plane, whether a block of ice is placed between these saws on its end or on its edge, as will be referred to hereinafter.

There are also provided saws 14 and 15 mounted respectively on shafts 16 and 17 of motors 18 and 19 connected to a source of power by wires (not shown). These motors are free to move vertically on one of the channel irons as shown in the drawings which provides a guide way for the rollers 21 secured to the motor by members 22.

The motors are connected to opposite ends of a chain or cable 23 passing over pulleys 24. The pulleys are mounted on shafts 25 seated in bearings 26. The length of this chain or cable is such that when one saw is above the block of ice, the other saw is below the block of ice, as clearly shown in the drawings.

Figure 9:
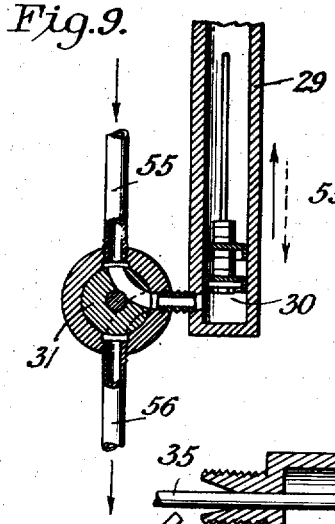
Figure 9 is a view similar to Figure 6, showing a single-action cylinder, valve and parts.

The motor operating the saw 14 has a counterweight 14′ and is also connected to a cable or chain 27 which passes over wheel 28 and then downward into a cylinder 29 illustrated in detail in Figure 9. This cylinder includes a weighted piston 30 and a valve 31 controlled by a disk 32.

There is also provided a cylinder 33, including a piston, piston rod 35, valve 36, valve disk 37 and valve control rod 38 and an arm 39—the rod 35 including an ice pusher 40. These parts will be referred to hereinafter in describing the operation of the machine.

Figure 2:
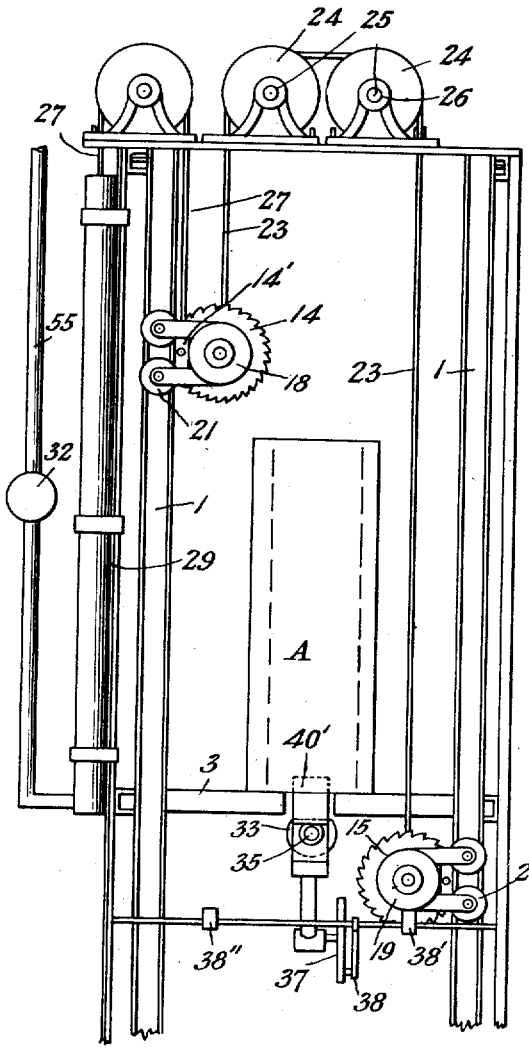
Figure 2 is an end view.
Figure 3:
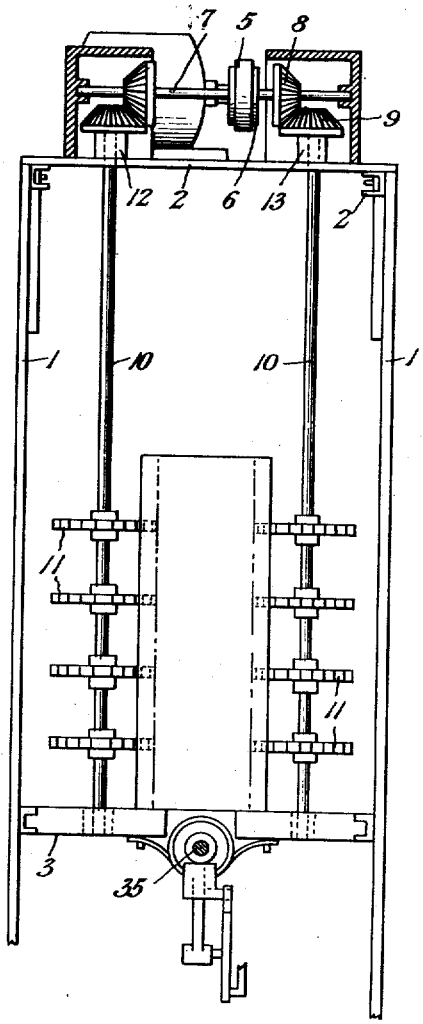
Figure 3 is a vertical sectional view taken on the line 3—3 of Figure 1.

When a block of ice is placed in the machine for vertical scoring, fluid pressure is admitted to the bottom of cylinder 29, raising the weighted piston 30, whereupon the weight of the saw 14 and motor 18 including the counterweight 14′ is sufficient to cause this motor and saw to descend and thereby pulling the motor 19 and its saw 15 to the top of the frame and scoring the ice block A vertically. In Figs. 1 and 2 the position of the motor saw units 14, 18 and 15, 19 is shown just after the commencement of this motion.

Figure 4:
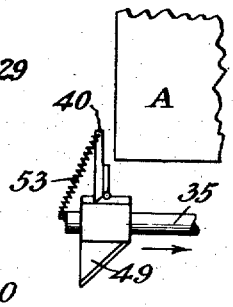
Figures 4 and 5 are detail views of an ice pusher, illustrating the same in different positions.
Figure 5:
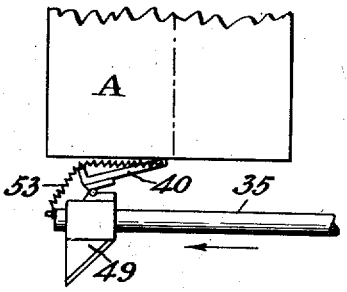
Figure 10:
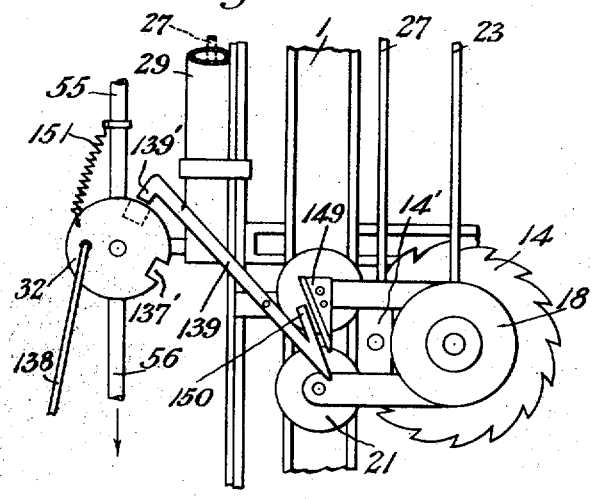
Fig. 10 is a detail view showing the application to the valve controlling the cylinder of Fig. 9 of automatic actuating means similar to that employed with the valve shown in Fig. 6.

When the motors have thus changed positions, they may either be retained in the new position until the block of ice is removed and another one is placed in the machine, or they may be automatically moved back to the first position before removing the ice block. Thus, the motor-saw units may be retained in changed position after admission of fluid to the cylinder 29 simply by leaving the valve 31 in the fluid admitting position shown in solid lines in Fig. 9, or by turning it to an intermediate position in which the fluid in the cylinder 29 is not released, and after removal of the scored block and positioning of a new one, the scoring devices may be returned to their original position simply by turning the valve 31, Fig. 9, to the fluid releasing position shown in dotted lines, so that the weighted piston 30 may descend, and during this return to original position the motor-saw units will effect scoring of the second block of ice. Or on the other hand, to automatically move back the motors to their first position before removal of the scored ice block, it is but necessary, for example, as indicated in Fig. 10, to control the valve disc 32 by a spring 151 and parts 138, 137′, 139—139′—150, and 149 (corresponding, respectively, to the spring 51 and parts 38, 37′ and 39—39′—50 in Fig. 6 and the part 49 in Figs. 4 and 5, hereinafter more fully described) so that engagement of the parts 137′, 139′ will catch the valve disc 32 when moved to turn the valve 31 to fluid admitting position and hold the same thereat until the piston 30 (Fig. 9) has completed its stroke, when tripping of the parts by the triangular shaped member 149 will enable the spring 151 to turn the valve to the dotted line position shown in Fig. 9, thus to automatically cut-off and release fluid pressure from the cylinder 29 and allow descent of the weighted piston 30 to return the motor-saw units to their first position, the saws 14—15, during this movement, passing through the kerfs already formed.

After vertically scoring the ice block it may be removed from the machine by means of the double-action cylinder 33. The operation of this cylinder is such that when the saw 15 is in its lowermost position, slightly lower than as shown in Figure 1, the motor 19 depresses the finger 38′ pulling the rod 38 to the position shown in dotted lines in Fig. 7. Since the rod 38 is connected to the valve disc 37, the disc is moved around until the notch 37′ registers with the projection 39′ on the arm 39 as shown in dotted lines in Figs. 1 and 7. This causes the valve 36 to open, admitting fluid pressure into the valve through pipe 44. The valve is then open as indicated by dotted lines in Figure 6 and the fluid pressure passes into pipe 45 in the direction of the dotted line arrow to the left in Figure 6, moving the piston 34 to the right. Any exhaust air or liquid will then pass from the cylinder through pipe 46 through the valve, thence out pipe 48.

This movement of the piston rod 35 will pull the ice pusher 40 to the right in the drawings, moving the block of ice A to the position A′ and in moving to this position the block is drawn between the saws 11 and scored horizontally by the saws, and at the same time removed from the machine.

Figure 6:
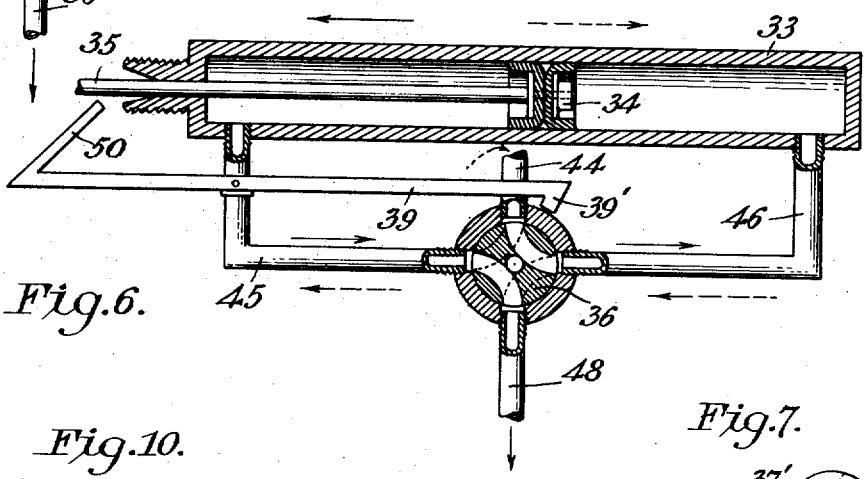
Figure 6 is a detail sectional view of a double-action cylinder and its valve and coacting parts.
Figure 7:
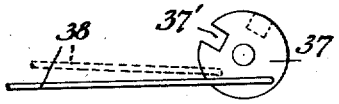
Figure 7 is a side view of a valve disk and rod for operating a valve.
Figure 8:
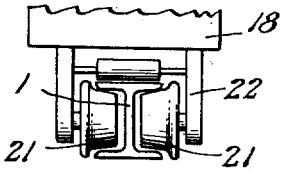
Figure 8 illustrates a sectional detail view of a bracket and rollers for guiding one of the vertical saws.

The piston 34 is then at the right end of the cylinder 33 and when the pusher has moved to the position 40′ the triangular shaped member 49 comes in contact with the finger 50 on arm 39, thus throwing the finger 39′ out of the notch 37′ and as soon as the finger 38′ is allowed to rise by movement of the motor 19 to the position shown in Fig. 1 by admission of fluid pressure to the cylinder 29 (Figs. 2 and 9), the valve disc 37 and the valve 36 are returned to the position shown by full lines in Figs. 1, 6 and 7, being returned by the spring 51. Fluid pressure is then admitted in pipe 44, flowing in pipe 46 in direction of full-line arrow, and the piston rod is returned to former position. The pusher is hinged and readily passes under a block of ice and when free is returned to normal upright position by the spring 53. The exhaust in left side of the piston 33 then passes through pipes 45 and 48 in direction of full line arrows in Figure 6.

Using only the finger 38′ actuated by the motor 19 it will be seen that the pusher 40 will be operated to remove the scored block only after the motor saw units have been moved from the position shown in Figs. 1 and 2 to changed position and back again, either by manual control of valve 31 as hereinafter described or by automatic control thereof as above described. However, as shown in Fig. 2, I may provide a second finger 38″ to be operated by the motor 18 if the motor-saw units are to be retained in changed position during removal of the scored block, so that when the motor 18 reaches its lowermost position it will depress the finger 38″ and initiate operation of the pusher 40 to remove the block. For economy this may be effected, as in the form shown, by having the finger 38″ operate the same bell-crank system as is operated by the finger 38′ to effect pulling of the same rod 38 to operate the same valve control disc 37.

The valve disc 32 controlling valve 31 may be operated manually by any preferred means, the pressure entering through pipe 55 and exhausting through pipe 56 in the direction of the arrows if it is not desired to use automatic control means such as that shown in Figs. 6 and 10 and described above.

It is evident that the vertical scoring of the ice may be made before the horizontal scoring, or the horizontal scoring made prior to the vertical scoring. Also that the fluid pressure means as used in cylinder 33 may be used to pull the ice into the machine as well as to remove it therefrom.

If desired the operation of the vertical saws may be omitted and the machine used to make the horizontal scores only, while the block standing on end is passed through the horizontal saws by fluid pressure means.

The scoring of ice is limited almost exclusively to the scoring of standard cakes of artificial ice known in the trade as "can-ice", and considerable difficulty has been experienced heretofore in obtaining accurate subdivision thereof because such blocks are tapered to facilitate removal from the cans.

A particular advantage of my improved method of scoring such blocks while standing on end, as shown in the drawings, resides in the fact that by this mode of scoring I am able to entirely eliminate the effect of the taper of such blocks upon the resulting subdivisions thereof, and obtain accurate and uniform scoring, both longitudinally and transversely of the block; a desideratum heretofore obtained only by jacking up the small end of the block before scoring, or otherwise complicating the scoring precedure and apparatus.

According to my improved method I take advantage of the fact that the commercial can-ice block is frozen in a symmetrically tapered can having its bottom at right angles to its longitudinal axis, so that the end of the block frozen therein is at right angles to the longitudinal axis of the block; and by standing the block "on end" for scoring, I position its longitudinal axis vertically thereby insuring that the longitudinal grooving produced by simple vertical scoring will parallel the longitudinal axis of the block and divide it symmetrically, and, where the longitudinal scores are positioned to halve the block longitudinally, medially of its scored faces as shown. In addition, as above pointed out, this method of scoring insures the accurate positioning of the transverse scores so that accurate and symmetrical final subdivision of the block is obtained.

Furthermore, by embodying this method of scoring ice blocks while standing on end in an ice scoring machine such as that disclosed herein, numerous advantages are obtained, such as economy of floor space, economy of power, and economy of labor.

Though I have described with great particularity of detail a specific embodiment of my invention, yet it is not to be understood therefrom that the invention is restricted to the particular embodiment disclosed. Various modifications thereof in detail and in the arrangement of the parts may be made by those skilled in the art without the departure from the invention as defined in the following claims.

I claim:

1. In an ice scoring machine, a pair of scoring devices respectively comprising movable saw and motor units spaced apart substantially the width of a block of ice, and means for moving said respective units vertically in opposite directions for simultaneously scoring opposite sides of an ice block.

2. In an ice scoring machine, a pair of scoring devices respectively comprising movable rotating saw and motor units spaced apart substantially the width of a block of ice, and means for moving said respective rotating saw and motor units in opposite directions for simultaneously scoring opposite sides of an ice block.

3. In an ice scoring machine, a pair of scoring devices spaced apart substantially the width of a block of ice, and fluid pressure means for moving said scoring devices vertically in opposite directions for simultaneously scoring opposite sides of an ice block.

4. In an ice scoring machine, a pair of scoring devices respectively comprising movable saw and motor units spaced apart substantially the width of a block of ice, actuating means for moving said respective units vertically in opposite directions for simultaneously scoring opposite sides of an ice block, and means for automatically cutting off said actuating means when the scoring is completed.

5. In an ice scoring machine, a pair of scoring devices spaced apart substantially the width of a block of ice, fluid pressure means for moving said scoring devices vertically in opposite directions for simultaneously scoring opposite sides of an ice block, and means for automatically cutting off and releasing the fluid pressure as soon as the vertical scoring operation is complete.

6. In an ice scoring machine, a pair of scoring devices spaced apart substantially the width of a block of ice, fluid pressure means for moving said scoring devices vertically in opposite directions for simultaneously scoring opposite sides of an ice block, means for automatically cutting off and releasing the fluid pressure as soon as the vertical scoring operation is complete, and horizontally disposed scoring means for scoring the block after the vertical scoring operation.

7. In an ice scoring machine, a pair of scoring devices spaced apart substantially the width of a block of ice, fluid pressure means for moving said scoring devices vertically in opposite directions for simultaneously scoring opposite sides of an ice block, means for automatically cutting off and releasing the fluid pressure as soon as the vertical scoring operation is complete, means for scoring the blocks of ice horizontally after said vertical scoring operation, automatically operating fluid pressure means for advancing the ice to said horizontal scoring means after the vertical scoring operation, and means for automatically cutting off and releasing fluid pressure from said ice advancing means after the horizontal scoring is completed.

8. The method of scoring an ice block while the ice is on end which consists in simultaneously moving ice scoring means vertically in opposite directions on opposite sides of the block.

9. An ice scoring machine comprising a framework, motors carrying saws vertically slidable on opposite sides of said framework, the said saws being spaced apart substantially the width of a block of ice, fluid pressure means for moving said motors and saws vertically in opposite directions for simultaneously scoring a block of ice, horizontal stationary saws for scoring the ice after the vertical scoring operation is completed, fluid pressure means for advancing the ice to the stationary saws, and means for automatically cutting off and releasing fluid pressure from each said fluid pressure means after its respective operation is completed.

10. The method of scoring an ice block while the ice is on end by simultaneously moving ice scoring means vertically and substantially medially on opposite sides of the block.

11. The method of longitudinally scoring a block of ice that eliminates the effect of taper in scoring a tapered ice-block such as a commercial "can-ice" block which consists in standing the block on end to position its longitudinal axis vertically, and moving ice scoring means vertically and substantially medially on opposite sides of the block, thereby longitudinally dividing it substantially symmetrically.

12. The method of longitudinally scoring a block of ice that eliminates the effect of taper in scoring a tapered ice-block such as a commercial "can-ice" block which consists in standing the block on end to position its longitudinal axis vertically and moving ice scoring means vertically and substantially medially of an upstanding face of the block to be scored, thereby longitudinally scoring it substantially symmetrically.

13. The method of longitudinally scoring a block of ice that eliminates the effect of taper in scoring a tapered ice-block such as a commercial "can-ice" block which consists in standing in standing the block on end to position its longitudinal axis vertically, and symmetrically longitudinally dividing the block by vertically scoring the same.

14. The method of scoring a block of ice that eliminates the effect of taper in scoring a tapered ice-block such as a commercial "can-ice" block which consists in standing the block on end to position its longitudinal axis vertically, symmetrically longitudinally dividing the block by vertically scoring the same, and symmetrically transversely dividing the block by horizontally scoring the same.

15. A machine for symmetrically scoring delivery-size block-ice, and particularly standard size tapered "can-ice", to facilitate its accurate subdivision in retailing comprising a frame provided with means to receive and support the block on end with its longitudinal axis vertical and means for kerfing said block vertically to symmetrically longitudinally score the same.

16. A machine for symmetrically scoring delivery-side block-ice, and particularly standard size tapered "can-ice", to facilitate its accurate subdivision in retailing comprising a frame provided with means to receive and support the block on end with its longitudinal axis vertical, vertically operable scoring means associated with said frame, and means for producing relative vertical motion between said block and said scoring means.

17. A machine for symmetrically scoring delivery-size block-ice, and particularly standard size tapered "can-ice", to facilitate its accurate subdivision in retailing comprising a frame provided with means to receive and support the block on end with its longitudinal axis vertical, and means to vertically and horizontally score said block, thereby to accurately score the same parallel to and transversely of its said longitudinal axis.

18. A machine for symmetrically scoring delivery-size block-ice, and particularly standard size tapered "can-ice", to facilitate its accurate subdivision in retailing comprising a frame provided with means to receive and support the block on end with its longitudinal axis vertically upstanding, vertically operable scoring saws associated with said frame and means for moving the same to longitudinally score said block, horizontally operable scoring saws adjacent said frame; and means for moving said upstanding block into engagement with said horizontally operable saws to transversely score the same.

19. In an ice scoring machine, a pair of vertical scoring devices spaced apart substantially the width of a block of ice, means for moving said scoring devices vertically for simultaneously scoring opposite sides of an ice block positioned to stand therebetween, horizontal scoring means adjacent said vertical scoring devices for scoring ice blocks horizontally during advance thereof adjacent said standing position thereof, reciprocable fluid pressure means to effect such advance of the ice blocks adjacent said standing position thereof and thus effect such horizontal scoring thereof, and means to control the supply and release of fluid pressure from said fluid pressure means automatically operated at the completion of a scoring movement of said vertical scoring devices to effect advance of said reciprocable fluid pressure means and automatically operable, after completion of such advance and commencement of the next subsequent movement of said vertical scoring devices, to return said reciprocable fluid pressure means to position for advancing the next subsequent ice block.

ROBERT H. ROARK.